United States Patent
Yasuda (10) Patent No.: US 12,082,571 B2
(45) Date of Patent: *Sep. 10, 2024

(54) BRAKING DEVICE THAT BRAKES SPOOL AND FISHING REEL PROVIDED WITH THE SAME

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/890,861

(22) Filed: Aug. 18, 2022

(65) Prior Publication Data

US 2023/0068397 A1 Mar. 2, 2023

(30) Foreign Application Priority Data

Aug. 27, 2021 (JP) ................. 2021-138526

(51) Int. Cl.
*A01K 89/0155* (2006.01)
*A01K 89/033* (2006.01)

(52) U.S. Cl.
CPC ...... *A01K 89/01555* (2013.01); *A01K 89/033* (2013.01)

(58) Field of Classification Search
CPC .... A01K 89/00; A01K 89/033; A01K 89/017; A01K 89/056; A01K 89/0155; A01K 89/01555
USPC ...................................................... 242/288
See application file for complete search history.

(56) References Cited

U.S. PATENT DOCUMENTS

| | | | | |
|---|---|---|---|---|
| 2,967,676 A | * | 1/1961 | Klingberg | A01K 89/033 254/26 R |
| 4,710,689 A | * | 12/1987 | Uetsuki | A01K 89/01555 318/630 |
| 4,779,814 A | | 10/1988 | Uetsuki et al. | |
| 4,821,975 A | | 4/1989 | Uetsuki et al. | |

(Continued)

FOREIGN PATENT DOCUMENTS

| CN | 106417204 A | 2/2017 |
|---|---|---|
| JP | H04051581 Y | 12/1992 |

(Continued)

OTHER PUBLICATIONS

Aug. 29, 2023 Office Action issued in U.S. Appl. No. 17/890,043.

(Continued)

*Primary Examiner* — Michael R Mansen
*Assistant Examiner* — Henrix Soto
(74) *Attorney, Agent, or Firm* — Oliff PLC (57) ABSTRACT

A braking device of a double bearing reel that brakes a spool rotatably mounted on a reel body of a double bearing reel on which a fishing line may be wound, the braking device provided with a braked unit attached to the spool, a braking unit that applies a braking force to the braked unit, a motor capable of driving a part of the braked unit, a reduction mechanism that transmits drive of the motor to a part of the braked unit, and a power supply that supplies electric power to the motor, in which a reduction ratio r of the reduction mechanism satisfies r>Mmax/C when holding torque of the motor is set to C, and maximum torque required to move the braked unit is set to Mmax.

9 Claims, 4 Drawing Sheets

(56) References Cited

U.S. PATENT DOCUMENTS

| | | | |
|---|---|---|---|
| 5,556,048 A * | 9/1996 | Hashimoto | A01K 89/01555 242/288 |
| 6,045,076 A * | 4/2000 | Daniels | A01K 89/01555 242/287 |
| 6,412,722 B1 * | 7/2002 | Kreuser | A01K 89/01555 242/288 |
| 11,930,800 B2 | 3/2024 | Yasuda | |
| 2004/0140163 A1 | 7/2004 | Ikuta et al. | |
| 2006/0169813 A1 | 8/2006 | Nakagawa et al. | |
| 2007/0108330 A1 | 5/2007 | Ikuta et al. | |
| 2010/0006686 A1 | 1/2010 | Yusa et al. | |
| 2011/0238250 A1 * | 9/2011 | Takao | B62M 6/45 701/22 |
| 2017/0172130 A1 * | 6/2017 | Komemushi | G01P 3/487 |
| 2017/0208789 A1 * | 7/2017 | Numata | A01K 89/033 |
| 2018/0199554 A1 | 7/2018 | Ogose et al. | |
| 2020/0140245 A1 * | 5/2020 | Yasuda | B64U 10/13 |
| 2020/0165109 A1 | 5/2020 | Niitsuma | |
| 2023/0060902 A1 | 3/2023 | Yasuda | |

FOREIGN PATENT DOCUMENTS

| | | |
|---|---|---|
| JP | 3977748 B2 | 9/2007 |
| WO | 2018/194026 A1 | 10/2018 |

OTHER PUBLICATIONS

Jul. 28, 2023 Office Action issued in U.S. Appl. No. 17/890,855.
Jan. 22, 2024 Office Action issued in U.S. Appl. No. 17/890,855.
Jun. 20, 2024 Office Action issued in Chinese Application No. 202211023156.2.

* cited by examiner

BRAKING DEVICE THAT BRAKES SPOOL AND FISHING REEL PROVIDED WITH THE SAME

CROSS-REFERENCE TO RELATED APPLICATIONS

This application claims priority under 35 U.S.C. § 119 to Japanese Patent Application No. 2021-138526 filed on Aug. 27, 2021, in the Japanese Patent Office, the entire contents of which is hereby incorporated by reference.

BACKGROUND

The present disclosure relates to a braking device, especially a braking device of a double bearing reel that brakes a spool rotatably mounted on a reel body, and a fishing reel provided with the same.

FIELD

Conventionally, a braking device that brakes a spool for preventing backlash at the time of casting (throwing) is provided on a double bearing reel, especially a bait casting reel in which a device such as a lure is mounted on a tip of a fishing line for casting (throwing). As the braking device of this type, there is a braking device in which a magnet is rotated by a motor to automatically adjust backlash prevention adjustment as disclosed in JP 4-051581 U.

In JP 4-051581 U, a CPU calculates a rotational speed and rotational acceleration of a spool by a signal from a sensor that detects rotation of the spool and a signal of a timer circuit, and compares the rotational speed and the rotational acceleration with data at each fixed time, so that it is possible to extend a flying distance of a device by braking the spool by generating an eddy current in a non-magnetic conductor when a difference of a certain value or larger is generated. In such braking device, an intermittent gear is pivotally supported on a reel body in a rotatable manner, and the intermittent manual gear is meshed with a motor shaft gear or a magnet gear in a disengageable manner, so that manual adjustment may be performed when desired even when a battery of the motor is exhausted.

SUMMARY

However, in the braking device according to JP 4-051581 U, since it is necessary to arrange the intermittent manual gear in the vicinity of an exterior portion of the reel in order to enable user operation, there is restriction that another part cannot be arranged outside the same, so that there has been a problem that the reel becomes large in size.

The present disclosure is achieved in view of the above-described circumstances, and an object thereof is to take measures against battery exhaustion without increasing a size of a fishing reel in a braking device of a spool capable of adjusting a braking force by a motor. Other objects of the present disclosure will become apparent by reference to the entire specification.

A braking device of a double bearing reel according to one embodiment of the present disclosure is a braking device of a double bearing reel that brakes a spool rotatably mounted on a reel body of a double bearing reel on which a fishing line may be wound, the braking device provided with a braked unit attached to the spool, a braking unit that applies a braking force to the braked unit, a motor capable of driving a part of the braked unit, a reduction mechanism that transmits drive of the motor to a part of the braked unit, and a power supply that supplies electric power to the motor, in which a reduction ratio r of the reduction mechanism satisfies r>Mmax/C when holding torque of the motor is set to C, and maximum torque required to move the braked unit is set to Mmax.

The braking device of the double bearing reel according to one embodiment of the present disclosure is further provided with a remaining amount detection unit that detects a battery remaining amount, and a control unit that controls the motor, in which the control unit turns off a power supply of the braking device after the braking unit is put into a predetermined state in a case of detecting that the battery remaining amount becomes a predetermined value or smaller.

In the braking device of the double bearing reel according to one embodiment of the present disclosure, the braked unit is a conductive member, and the braking unit is a magnetic circuit including at least one rotatable magnet that applies a magnetic force to the conductive member.

In the braking device of the double bearing reel according to one embodiment of the present disclosure, the braking unit is a magnetic circuit including at least one rotatable magnet that applies a magnetic force to the conductive member, and the predetermined state is a state of being held at a position of the rotatable magnet when it is detected that the battery remaining amount becomes a predetermined value or smaller.

In the braking device of the double bearing reel according to one embodiment of the present disclosure, the reduction mechanism is one or a plurality of reduction gears.

In the braking device of the double bearing reel according to one embodiment of the present disclosure, an operation unit accessible from outside is provided on any of the one or the plurality of reduction gears. In the braking device of the double bearing reel according to one embodiment of the present disclosure, the operation unit is a recess.

A fishing reel according to one embodiment of the present disclosure is provided with any one of the above-described braking devices. The fishing reel according to one embodiment of the present disclosure is provided with a tool hole through which the reduction mechanism is accessible.

According to the above-described embodiment, when a motor power supply is lost, a braking device may keep its own position against a magnetic force generated in a magnetic circuit. In this manner, it becomes possible to provide a braking device capable of taking measures against battery exhaustion without increasing a size of a reel, and a fishing reel provided with the same.

DETAILED DESCRIPTION

Hereinafter, an embodiment of a braking force control device and a fishing reel provided with the same according to the present disclosure is specifically described with reference to the accompanying drawings. Components common in a plurality of drawings are assigned with the same reference signs throughout the plurality of drawings. Note that, the drawings are not necessarily drawn to scale for convenience of description.

A braking device of a double bearing reel and a fishing reel provided with the same according to one embodiment of the present disclosure are described with reference to FIGS. 1 to 4.

Figure 1:
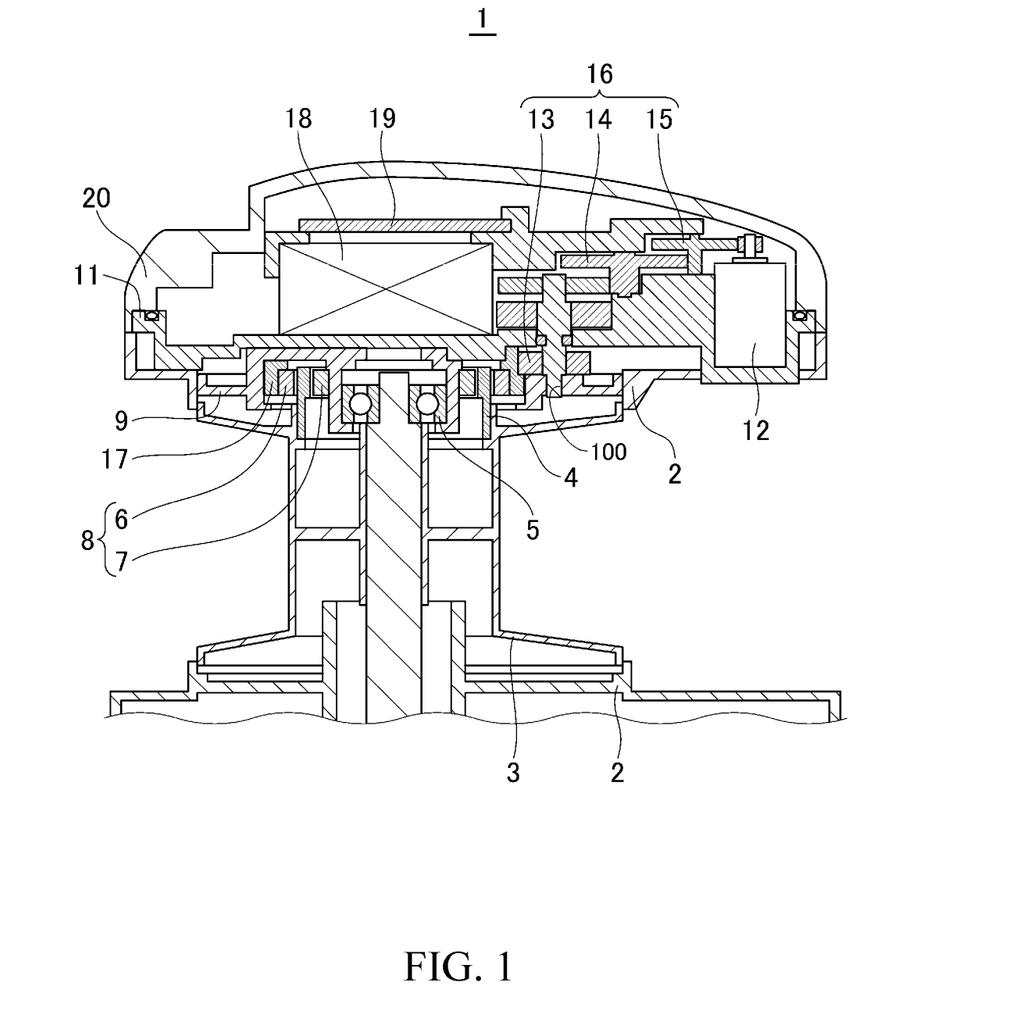
FIG. 1 is a view for illustrating a fishing reel provided with a braking device according to one embodiment of the present disclosure.

First, FIG. 1 is a cross-sectional view of a fishing reel 1 taken along a central axis of a reduction gear train to be described later. Note that, for the sake of simplicity of description, some of known functions of the fishing reel 1 are not illustrated or described.

As illustrated in FIG. 1, the fishing reel 1 according to one embodiment of the present disclosure is formed of a frame (reel body) 2, a spool 3, a braked unit (braked means) 4, a bearing 5, a braking unit (braking means) 8 including a rotating magnet 6 and a fixed magnet 7, a set plate 9, an inner lid 11, a motor 12, a reduction mechanism (reduction gear train) 16 including a gear 13, a gear 14, and a gear 15, a magnet gear 17, a battery 18, a control board 19, and an outer lid 20. Herein, a braking device according to one embodiment of the present disclosure described later includes the braked unit 4 and the braking unit 8 including the rotating magnet 6 and the fixed magnet 7, but may include other components.

The frame (reel body) 2 may be attached to a fishing rod (not illustrated). The fishing reel 1 includes an operation means (handle) not illustrated as is the case with a conventional fishing reel and may wind a fishing line by rotating the spool in a forward direction by a user operation. Rotation of the handle is transmitted to the spool by a transmission means such as a gear not illustrated.

The fishing reel 1 includes a clutch means not illustrated, and a user may select connection and disconnection of power transmission to the spool by operating the clutch means. In a connected state, winding by the operation means is possible. In a disconnected state, the spool may be freely rotated in forward and backward directions, and the fishing line may be released.

The fishing reel 1 may also be provided with a drag means (not illustrated) that prevents breakage of the fishing line by idling the spool when torque of a predetermined value or larger is applied, and a reverse rotation prevention means (not illustrated) that prevents reverse rotation of the handle. Furthermore, an oscillator device (not illustrated) that uniformly winds the fishing line by reciprocating a position of a guide unit that guides the fishing line according to the rotation of the spool may be provided.

The spool 3 is supported so as to be rotatable with respect to the reel body 2, and may wind the fishing line on an outer periphery thereof by rotating in a forward direction. When casting (throwing) a lure and the like, this releases the wound fishing line by rotating in a backward direction. When a release amount of the fishing line is too much larger than a movement amount of the lure and the like at that time, line entanglement referred to as backlash occurs by an excessive line and hinders normal use of the fishing reel 1. Therefore, an appropriate braking force is applied to the spool 3 by a braking device 10 to be described later to prevent the backlash.

The braked unit (induct rotor) 4 is fixed coaxially and non-rotatably with respect to the spool 3, so that braking torque may be applied to the spool 3. The braked unit 4 is made of a conductor such as aluminum, copper, or iron, for example, and is formed into a substantially cylindrical shape. In the braking device 10 according to one embodiment of the present disclosure, a so-called eddy current brake that applies a braking force by an eddy current generated in the braked unit 4 is used. That is, when a magnetic field is applied to the braked unit 4 from the outside, the eddy current is generated in the braked unit during motion. An interaction between the eddy current and the magnetic field generates the braking torque proportional to an angular speed of the spool 3 and intensity of the magnetic field.

The set plate 9 illustrated in FIG. 1 may be fixed to the frame 2. When the set plate 9 is fixed to the frame 2, the spool 3 is rotatably and pivotally supported. The fixed magnet 7 and the rotating magnet (movable magnet) 6 are held by the set plate 9 to form the braking device 10 to be described later. A side plate unit may be formed by integrating the set plate 9, the inner lid 11, and the outer lid 20. A watertight chamber is formed of the inner lid 11 and the outer lid 20, and electric parts such as the board, battery, motor, and sensor may be housed in the watertight chamber.

Next, a configuration of the braking device 10 according to one embodiment of the present disclosure is described. In the braking device 10 according to one embodiment of the present disclosure, the magnetic field is applied to the braked unit by a magnetic circuit including at least one permanent magnet. Two permanent magnets form the magnetic circuit, and the magnetic field applied to the braked unit may be adjusted by relatively moving the permanent magnets.

Figure 2A:
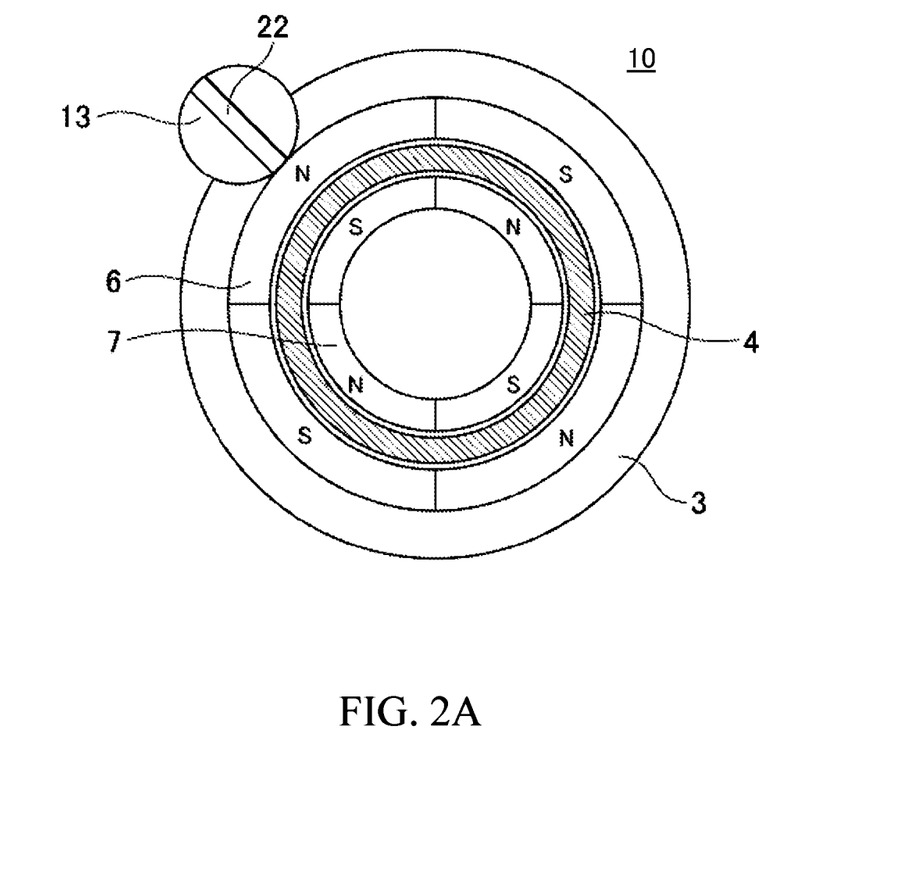
FIGS. 2A and 2B are views illustrating a configuration of the braking device according to one embodiment of the present disclosure or the braking device in the fishing reel.
Figure 2B:
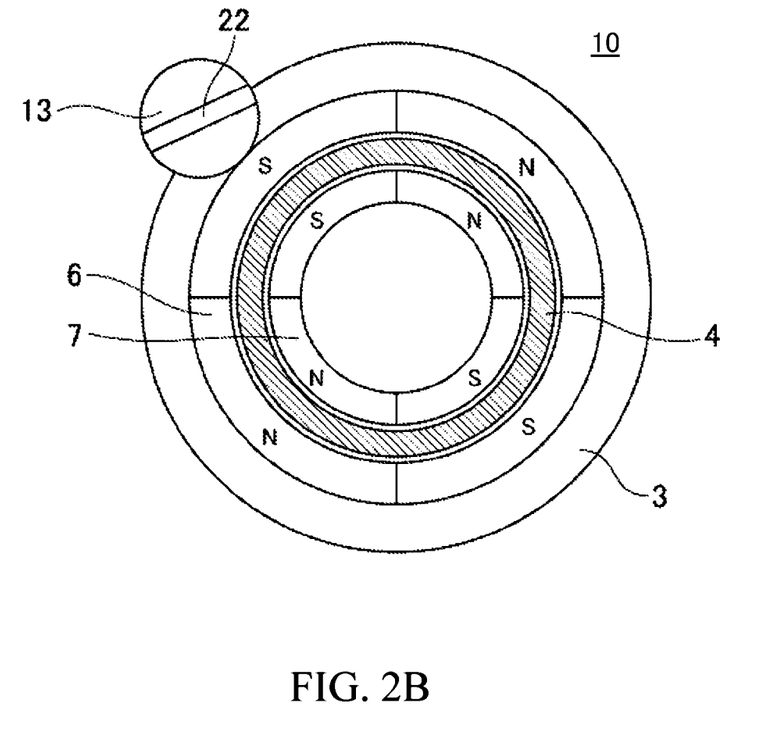

As illustrated in FIGS. 2A and 2B, the fixed magnet 7 is arranged on an inner peripheral side of the braked unit (braked member) 4, and the rotating magnet 6 is arranged on an outer peripheral side of the braked unit 4. Each of the rotating magnet 6 and the fixed magnet 7 is divided into N equal parts (four equal parts in the example in FIG. 2) in a circumferential direction, and alternately magnetized to N poles and S poles. As a result, the magnetic field penetrating the braked unit 4 is formed.

In a state in FIG. 2A, the S pole of the fixed magnet 7 and the N pole of the rotating magnet 6 face each other. That is, different poles face each other, and intensity of the magnetic field penetrating the braked unit is maximized. This state is set as a maximum braking state. In contrast, in a state in FIG. 2B, the S pole of the fixed magnet 7 and the S pole of the rotating magnet 6 face each other, that is, the same poles face each other, and the magnetic field penetrating the braked unit is minimized. This state is set as a minimum braking state.

The rotating magnet 6 is rotationally movable between a maximum braking state and a minimum braking state. Specifically, the rotating magnet 6 is fixed to the magnet gear (magnet holding gear) 17 made of resin and the like including a gear, and the magnet gear 17 is pivotally supported so as to be rotatable at an angle in a range of 0° to 90° with respect to the set plate 9. The magnet gear 17 receives transmission of rotation from the motor 12 via the reduction mechanism (reduction gear train) 16. As a result, the rotating magnet 6 may be rotated relative to the fixed magnet 7 by the motor 12. The reduction gear train 16 is a known reduction means, and is formed of three two-stage gears of the gear 13, the gear 14, and the gear 15 illustrated in FIG. 1 in one embodiment of the present disclosure, but there is no limitation, and any mode may be adopted. Herein, a reduction ratio by the reduction gear train is set to r.

Figure 3:
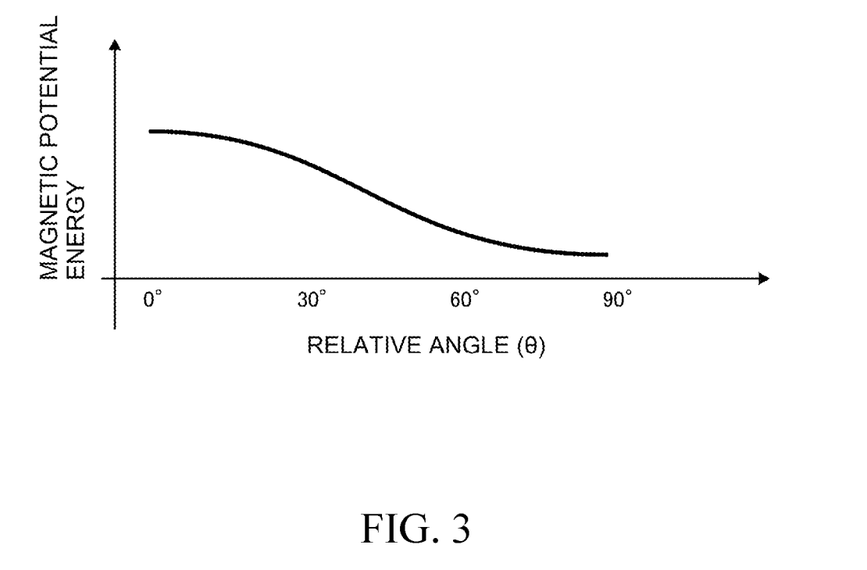
FIG. 3 is a view illustrating a relationship between a position $\theta$ of a rotating magnet with respect to a fixed magnet and magnetic potential energy of a magnetic circuit.

Next, FIG. 3 illustrates a relationship between a position θ of the rotating magnet with respect to the fixed magnet and magnetic potential energy of the magnetic circuit. As illustrated, the magnetic potential energy of the magnetic circuit is the highest in the minimum braking state in which the same poles face each other, and is the lowest in the maximum braking state in which the different poles face each other. Between them, this substantially changes with a Sin curve.

A braking device of a double bearing reel according to one embodiment of the present disclosure is a braking device of a double bearing reel that brakes a spool rotatably mounted on a reel body of a double bearing reel on which a fishing line may be wound, the braking device provided with a braked unit attached to the spool, a braking unit that applies a braking force to the braked unit, a motor capable of driving a part of the braked unit, a reduction mechanism that transmits drive of the motor to a part of the braked unit, and a power supply that supplies electric power to the motor, in which a reduction ratio r of the reduction mechanism satisfies r>Mmax/C when holding torque of the motor is set to C, and maximum torque required to move the braked unit is set to Mmax.

According to the braking device of the double bearing reel according to one embodiment of the present disclosure, when a motor power supply is lost, the braking device may keep its own position against a magnetic force generated in a magnetic circuit. In this manner, it becomes possible to provide a braking device capable of taking measures against battery exhaustion without increasing a size of a reel, and a fishing reel provided with the same.

Figure 4:
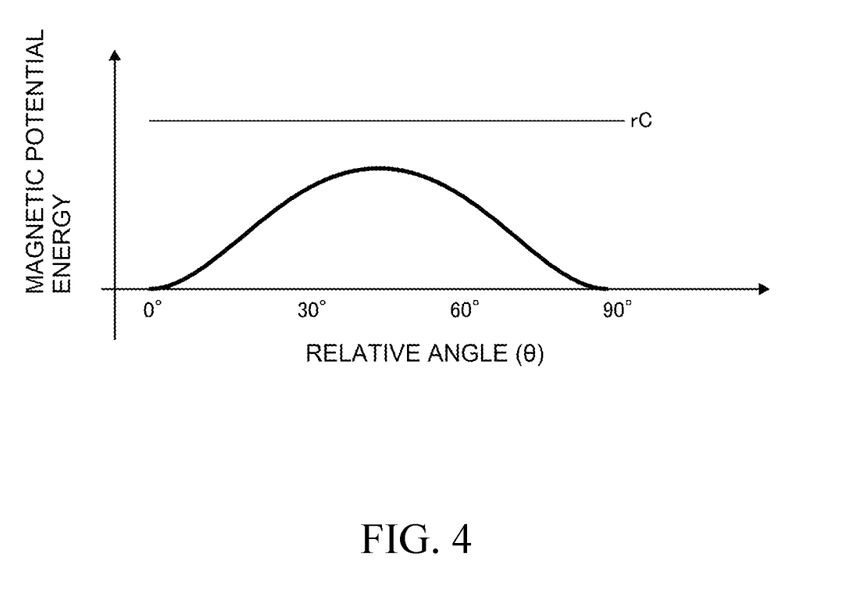
FIG. 4 is a view illustrating a relationship between the position $\theta$ of the rotating magnet with respect to the fixed magnet and magnitude $F(\theta)$ of a magnetic force acting on the rotating magnet.

FIG. 4 illustrates a relationship between the position θ of the rotating magnet with respect to the fixed magnet and magnitude F(θ) of a magnetic force acting on the rotating magnet. The magnetic force acting on the rotating magnet is obtained by differentiating the magnetic potential energy with respect to a distance, and substantially changes with a Cos curve. In each of the minimum braking state and the maximum braking state, the magnetic force becomes 0 and is a maximum magnetic force Mmax between them. The maximum braking state is a stable point, and even in a case where a minute angular change occurs, a restoring force to this point is generated. The minimum braking state is an instable point, and in a case where a minute angular change occurs, a magnetic force toward the stable point is generated.

In this manner, when the rotating magnet is in the minimum braking state, no magnetic force is applied to the rotating magnet, but when this displaces minutely while receiving an impact or vibration from the outside, a magnetic force toward the maximum braking state, which is the stable point, starts to be generated. When the rotating magnet is between the minimum braking state and the maximum braking state, a magnetic force toward the maximum braking state is generated. Furthermore, no magnetic force is generated when the rotating magnet is in the maximum braking state. When this displaces minutely while receiving an impact or vibration from the outside, a magnetic force to return to the maximum braking state is generated.

In one embodiment of the present disclosure, in order to move the rotating magnet by the motor, a moving force of the rotating magnet by the motor needs to be larger than the magnetic force generated between the rotating magnet and the fixed magnet. That is, when energizing torque of the motor (a torque at the state of energization of the motor) is set to T and the reduction ratio between the motor and the rotating magnet is set to r, it is necessary that r>Mmax/T is satisfied. As a result, the rotating magnet may be positioned at an arbitrary position against the magnetic force during the motor drive.

In contrast, in a case where the motor drive is stopped when the battery is exhausted or when the power supply of the control board is turned off, the motor receives torque in a rotational direction via the gear due to the magnetic force between the rotating magnet and the fixed magnet. When the motor is not energized, cogging torque generally caused by torque unevenness acting between a rotor and a stator, and holding torque C caused by friction torque of a bearing and the like are generated.

The reduction ratio r in the present disclosure satisfies r>Mmax/C. As a result, holding torque of rC is generated between the rotating magnet and the fixed magnet. FIG. 4 illustrates the torque rC. In this manner, the magnetic force F(θ) acting between the fixed magnet and the rotating magnet is smaller than the torque rC over an entire region. In this manner, with the braking device 10 and the fishing reel provided with the same according to one embodiment of the present disclosure, the holding torque (holding force) of the motor may be made larger than the magnetic force generated between the rotating magnet and the fixed magnet. As a result, the fixed magnet may keep its own position even when the motor is deenergized.

Herein, in the fishing reel disclosed in JP 4-051581 U, it is necessary to apply an appropriate braking force in order to prevent the magnet from moving in a case where the motor control is not performed; however, since this braking force is caused by a frictional force, there is a problem that this leads to energy loss and power saving becomes difficult. In contrast, in the braking device 10 and the fishing reel provided with the same according to one embodiment of the present disclosure, a reduction ratio of a reduction mechanism is made sufficiently large, so that self-holding torque sufficiently large with respect to the magnetic force may be secured even without the braking means by the frictional force such as an O-ring. This enables power saving.

Next, a control method by the braking device 10 according to one embodiment of the present disclosure is described. As described above, in one embodiment of the present disclosure, the rotating magnet is rotated relative to the fixed magnet by the motor, so that the braking torque to the spool may be adjusted to a predetermined amount. As necessary, by detecting a rotational movement amount and a rotational speed of the spool, the braking torque according to each situation is set.

In a control board, a control unit formed of a motor driver that applies a current to the motor and an electric part such as a microcomputer on which a program that determines a drive amount to the motor is mounted is arranged. The motor may be positioned by a known method such as feedforward control using a stepping motor or feedback control using a position sensor. As a result, the rotating magnet may be moved to a predetermined position to apply a predetermined braking force to the spool.

The braking device of the double bearing reel according to one embodiment of the present disclosure is further provided with a remaining amount detection unit that detects a battery remaining amount, and a control unit that controls the motor, in which the control unit turns off a power supply of the braking device after the braking unit is put into a predetermined state in a case of detecting that the battery remaining amount becomes a predetermined value or smaller.

In the braking device of the double bearing reel according to one embodiment of the present disclosure, the braked unit is a conductive member, and the braking unit is a magnetic circuit including at least one rotatable magnet that applies a magnetic force to the conductive member.

In the braking device of the double bearing reel according to one embodiment of the present disclosure, the braking unit is a magnetic circuit including at least one rotatable magnet that applies a magnetic force to the conductive member, and the predetermined state is a state of being held at a position of the rotatable magnet when it is detected that the battery remaining amount becomes a predetermined value or smaller.

In the braking device of the double bearing reel according to one embodiment of the present disclosure, the reduction mechanism is one or a plurality of reduction gears.

In the braking device of the double bearing reel according to one embodiment of the present disclosure, an operation unit accessible from outside is provided on any of the one or the plurality of reduction gears. In the braking device of the double bearing reel according to one embodiment of the present disclosure, the operation unit is a recess. In this manner, even in a case where the battery is exhausted, it is possible to move the rotating magnet connected to the reduction mechanism to an appropriate position by inserting a tool (for example, a flathead screwdriver) through a tool hole provided on the fishing reel (for example, a frame and the like) and engaging the same with an operation unit (for example, a recess) of the reduction mechanism.

A fishing reel according to one embodiment of the present disclosure is provided with any one of the above-described braking devices. According to the fishing reel provided with the braking device of the double bearing reel according to one embodiment of the present disclosure, when the motor power supply is lost, the braking device may keep its own position against the magnetic force generated in the magnetic circuit. In this manner, it becomes possible to provide a braking device capable of taking measures against battery exhaustion without increasing a size of a reel, and a fishing reel provided with the same.

The fishing reel according to one embodiment of the present disclosure is provided with a tool hole through which the reduction mechanism is accessible. According to the fishing reel provided with the braking device of the double bearing reel according to one embodiment of the present disclosure, it is possible to move the rotating magnet connected to the reduction mechanism to an appropriate position by inserting the tool (for example, the flathead screwdriver) through the tool hole and engaging the same with the operation unit (for example, the recess) of the reduction mechanism even in a case of the battery exhaustion.

In a state in which the battery remaining amount is sufficient, by driving the motor during casting (throwing) and appropriately adjusting the position of the rotating magnet, it is possible to apply an appropriate braking force according to a timing. This makes it possible to achieve both an increase in casting (throwing) distance and suppression of backlash. The control unit of the braking device 10 according to one embodiment of the present disclosure includes a battery remaining amount detection unit (battery remaining amount detection means) that detects a battery remaining amount, and in a case where the battery remaining amount becomes a predetermined value or smaller, this may turn off the power supply of the braking device after moving the rotating magnet to a predetermined position.

As a result, in a state in which the battery remaining amount is insufficient, the rotating magnet may be moved to a predetermined position before the power supply is turned off. The position of the rotating magnet at that time is preferably in the maximum braking state or near the same. As a result, although the casting (throwing) distance is reduced, a risk of occurrence of backlash may be reduced. This allows the user to continue fishing even when there is no battery remaining amount. Note that, the position of the rotating magnet before the power supply is turned off may be input by the user.

As the remaining amount detection unit for detecting the battery remaining amount, there is a method of detecting a power storage remaining amount of a battery on the basis of voltage drop of the battery, for example. In this case, a configuration of directly reading a potential difference of the battery or a configuration of reading a potential difference of shunt resistor provided in an electric circuit may be considered. In addition, there are a Coulomb counter method of measuring used electric power from full charge by integrating the used current, a battery cell modeling method of correcting the Coulomb counter method by learning a temporal change and an environmental change of the battery, an impedance track method of constantly recording impedance of the battery and the like, but the method is not limited to a specific method.

By providing the tool hole 100 that enables contact with the reduction gear (for example, the gear 13) forming the reduction mechanism on the fishing reel according to one embodiment of the present disclosure and providing an operation unit (engaged unit) 22 operable by the tool such as the recess on a part of the reduction gear (for example, the gear 13) forming the reduction mechanism as illustrated in FIG. 2, the user may operate the position of the reduction gear and the movable magnet. Herein, the tool hole may be provided on any of force transmission paths between the motor 12 and the rotating magnet 6, that is, the reduction mechanism 16, the magnet gear 17, and the rotating magnet 6. At that time, when the tool hole is provided on a side far from the motor, such as the gear 13, the magnet gear 17, and the rotating magnet 6, the tool hole is easily arranged outside the watertight chamber, which is advantageous when waterproofing.

More specifically, when the tool such as the flathead screwdriver is inserted through the tool hole, and the flathead screwdriver and the operation unit (for example, the recess) provided on a part of the reduction gear are engaged with each other, the movable magnet may be rotated when the reduction gear is rotated. Note that, various shapes and structures of the operation unit may be considered, and they are not limited to a specific mode. As a result, the braking torque applied to the spool may be adjusted even after the battery is exhausted. The reduction gear on which the operation unit 22 is provided may be any gear illustrated in FIG. 1, but is desirably a final reduction gear (gear 13 in FIG. 1) of the reduction mechanism to transmit to the movable magnet. As a result, it is possible to provide the tool hole enabling contact with the operation unit at a place easily accessible in a state in which the side plate unit is removed.

At that time, a scale indicating the position of the movable magnet may be provided. As a result, the user knows an indication of the braking force on the spool, and operability of adjustment work is further improved. According to the braking device 10 and the fishing reel provided with the same according to one embodiment of the present disclosure, it is possible to make the braking force on the spool adjustable even when the battery is exhausted relatively without restriction in layout. In this manner, it is possible to form the braking device that avoids an increase in size and cost of an entire device and the fishing reel provided with the same.

Dimensions, materials, and arrangements of the components described in this specification are not limited to those explicitly described in the embodiment, and the components may be modified to have any dimensions, materials, and arrangements that may fall within the scope of the present disclosure. Components not explicitly described in this specification may be added to the described embodiment, or some of the components described in each embodiment may be omitted.

What is claimed is:

1. A braking device of a double bearing reel that brakes a spool rotatably mounted on a reel body of a double bearing reel on which a fishing line may be wound, the braking device comprising:
    a braked unit attached to the spool;
    a braking unit that applies a braking force to the braked unit;
    a motor capable of driving a part of the braking unit;
    a reduction mechanism that transmits drive of the motor to a part of the braking unit; and
    a power supply that supplies electric power to the motor,
    wherein a reduction ratio r of the reduction mechanism satisfies r>Mmax/C where holding torque of the motor is C, and maximum torque required to move the braking unit is Mmax.

2. The braking device according to claim 1, further comprising:
    a remaining amount detection unit that detects a battery remaining amount; and
    a control unit that controls the motor,
    wherein the control unit turns off the power supply after the braking unit is put into a predetermined state when the battery remaining amount becomes a predetermined value or smaller.

3. The braking device according to claim 2, wherein the braking unit is a magnetic circuit including at least one rotatable magnet that applies a magnetic force to a conductive member, and the predetermined state is a state of being held at a position of the at least one rotatable magnet when the battery remaining amount becomes a predetermined value or smaller.

4. The braking device according to claim 1, wherein the braked unit is a conductive member, and the braking unit is a magnetic circuit including at least one rotatable magnet that applies a magnetic force to the conductive member.

5. The braking device according to claim 1, wherein the reduction mechanism is one or a plurality of reduction gears.

6. The braking device according to claim 5, wherein an operation unit accessible from outside of the braking device is on any of the one or the plurality of reduction gears.

7. The braking device according to claim 6, wherein the operation unit is a recess.

8. A fishing reel comprising:
    the braking device according to claim 1.

9. The fishing reel according to claim 8,
    wherein the fishing reel includes a tool hole through which the reduction mechanism is accessible.

* * * * *